US010371955B2

(12) United States Patent
Nakamura et al.

(10) Patent No.: US 10,371,955 B2
(45) Date of Patent: Aug. 6, 2019

(54) ILLUMINATION DEVICE HAVING A LENTICULAR LENS SHEET THAT IS FORMED IN A CONCAVE MANNER HAVING A PLANO-CONVEX CYLINDRICAL CONVEX SURFACE WITH A LIGHT SOURCE DISPOSED WITHIN THE CONVEX SURFACE

(71) Applicant: FUJIFILM Corporation, Tokyo (JP)

(72) Inventors: Samito Nakamura, Tokyo (JP); Hiromi Takenoshita, Tokyo (JP); Daisaku Abiru, Tokyo (JP); Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/947,527

(22) Filed: Apr. 6, 2018

(65) Prior Publication Data

US 2018/0227990 A1 Aug. 9, 2018

Related U.S. Application Data

(63) Continuation of application No. PCT/JP2016/079823, filed on Oct. 6, 2016.

(30) Foreign Application Priority Data

Oct. 9, 2015 (JP) ................................ 2015-201038

(51) Int. Cl.
*F21V 8/00* (2006.01)
*G02B 27/09* (2006.01)
(Continued)

(52) U.S. Cl.
CPC ........... *G02B 27/0966* (2013.01); *B60Q 3/12* (2017.02); *B60Q 3/16* (2017.02); *F21S 6/002* (2013.01);
(Continued)

(58) Field of Classification Search
CPC . F21V 5/04; F21V 5/043; F21V 5/046; F21V 7/0091; F21V 7/043; G02B 6/003;
(Continued)

(56) References Cited

U.S. PATENT DOCUMENTS 4,081,667 A * 3/1978 Lewin ....................... F21V 7/04
362/296.04
8,944,642 B2 * 2/2015 Kuo .......................... F21V 5/04
362/308

FOREIGN PATENT DOCUMENTS

JP H10-241414 A 9/1998
JP H11-317104 A 11/1999
(Continued)

OTHER PUBLICATIONS

International Search Report issued in PCT/JP2016/079823; dated Dec. 20, 2016.
(Continued)

*Primary Examiner* — Robert J May
(74) *Attorney, Agent, or Firm* — Studebaker & Brakett PC

(57) ABSTRACT

Provided is a high decorative illumination device that utilizes a lenticular lens sheet. An illumination device includes a lenticular lens sheet and an LED light source. The lenticular lens sheet is curved in an X direction, and a convex surface is formed in a concave shape. The LED light source is positioned inside the convex surface of the lenticular lens sheet. First and second reflection components from first and second bright points which are acquired by reflecting irradiation light rays from the LED light source from plano-convex cylindrical lenses are incident on left and right eyes of an observer who observes the illumination device. The
(Continued)

observer observes a virtual image as if a light emitter is present in a position in which the first and second reflection components cross each other.

9 Claims, 11 Drawing Sheets

(51) Int. Cl.

| | |
|---|---|
| ***G02B 3/00*** | (2006.01) |
| ***G02B 3/08*** | (2006.01) |
| ***G02B 19/00*** | (2006.01) |
| ***F21S 6/00*** | (2006.01) |
| ***F21S 8/06*** | (2006.01) |
| ***F21V 7/04*** | (2006.01) |
| ***B60Q 3/12*** | (2017.01) |
| ***B60Q 3/16*** | (2017.01) |
| *F21S 9/02* | (2006.01) |
| *F21Y 115/10* | (2016.01) |
| *F21Y 113/13* | (2016.01) |

(52) U.S. Cl.
CPC ................ *F21S 8/06* (2013.01); *F21V 7/043* (2013.01); *F21V 7/048* (2013.01); *G02B 3/00* (2013.01); *G02B 3/005* (2013.01); *G02B 3/0043* (2013.01); *G02B 3/08* (2013.01); *G02B 6/003* (2013.01); *G02B 19/0066* (2013.01); *F21S 9/02* (2013.01); *F21Y 2113/13* (2016.08); *F21Y 2115/10* (2016.08)

(58) Field of Classification Search
CPC ....... F21Y 2115/10; F21S 6/002; F21S 6/005; F21S 6/006; F21S 6/007; F21S 6/008
See application file for complete search history.

(56) References Cited

FOREIGN PATENT DOCUMENTS

| | | | | |
|---|---|---|---|---|
| JP | 2007-026827 A | 2/2007 | | |
| JP | 2007-257857 A | 10/2007 | | |
| JP | 2010-257610 A | 11/2010 | | |
| JP | 3178822 U | 10/2012 | | |
| WO | WO-2013041273 A1 * | 3/2013 | ............. | F21V 7/005 |

OTHER PUBLICATIONS

International Preliminary Report on Patentability issued in PCT/JP2016/079823; completed Oct. 17, 2017.

Extended European Search Report issued by the European Patent Office dated Sep. 20, 2018, which corresponds to EP16853709.0-1015 and is related to U.S. Appl. No. 15/947,527.

* cited by examiner

ILLUMINATION DEVICE HAVING A LENTICULAR LENS SHEET THAT IS FORMED IN A CONCAVE MANNER HAVING A PLANO-CONVEX CYLINDRICAL CONVEX SURFACE WITH A LIGHT SOURCE DISPOSED WITHIN THE CONVEX SURFACE

CROSS-REFERENCE TO RELATED APPLICATIONS

This application is a Continuation of PCT International Application No. PCT/JP2016/079823 filed on 6 Oct. 2016, which claims priority under 35 U.S.C § 119(a) to Japanese Patent Application No. 2015-201038 filed on 9 Oct. 2015. The above application is hereby expressly incorporated by reference, in its entirety, into the present application.

BACKGROUND OF THE INVENTION

1. Field of the Invention

The present invention relates to an illumination device that illuminates an inside of a room in which a lenticular lens sheet is used.

2. Description of the Related Art

An illumination device using a point light source such as a light emitting diode (LED) with high luminance and with low power consumption has come into wide use instead of an illumination device using an incandescent light bulb or a fluorescent lamp of the related art. For example, an illumination device described in JP2007-257857A includes a plurality of LEDs arranged in a straight-line shape on a substrate and a diffusion sheet disposed so as to cover the LEDs on a front surface thereof. The diffusion sheet is a lenticular lens sheet acquired by arranging a plurality of plano-convex cylindrical lenses in parallel, and diffuses and transmits light rays emitted from the LEDs.

SUMMARY OF THE INVENTION

The illumination device is not only simply used for illuminating a dark area, but also used for changing the mood inside or outside the room in many cases. However, in the illumination device described in JP2007-257857A, the lenticular lens sheet is used only for diffusing the light rays. Thus, only monotonous irradiation light passed through the lenticular lens sheet is emitted from the illumination device described in JP2007-257857A. There are problems that the illumination device described in JP2007-257857A is an illumination device that does not sufficiently use the lenticular lens sheet and is simply used for diffusing the light and lacks decorativeness.

An object of the present invention is to provide a highly decorative illumination device using the lenticular lens sheet.

An illumination device of the present invention includes a lenticular lens sheet and a light source. The lenticular lens sheet is acquired by arranging a plurality of plano-convex cylindrical lenses which extends in a first direction in a second direction perpendicular to the first direction. The lenticular lens sheet is curved in the first direction, and has a convex surface of the plano-convex cylindrical lenses formed in a concave shape. The light source is disposed inside the convex surface of the plano-convex cylindrical lenses.

It is preferable that the light source is a point light source. It is preferable that the lenticular lens sheet is curved in an arc shape.

It is preferable that a curvature of the lenticular lens sheet formed in the concave shape is changed as a distance from the light source becomes larger in the second direction. It is preferable that the curvature becomes smaller as the distance from the light source becomes larger in the second direction.

It is preferable that a light reflection film that reflects light of the light source is formed on the convex surface of the lenticular lens sheet.

It is preferable that the illumination device further comprises a support member that supports a portion around a position of the lenticular lens sheet in which the light source is disposed. It is preferable that the support member includes a light shielding portion that blocks light emitted from the light source in a direction perpendicular to the second direction. It is preferable that color of the light source is variable.

According to the present invention, it is possible to provide a highly decorative illumination device using the lenticular lens sheet.

DESCRIPTION OF THE PREFERRED EMBODIMENTS

First Embodiment

Figure 1:
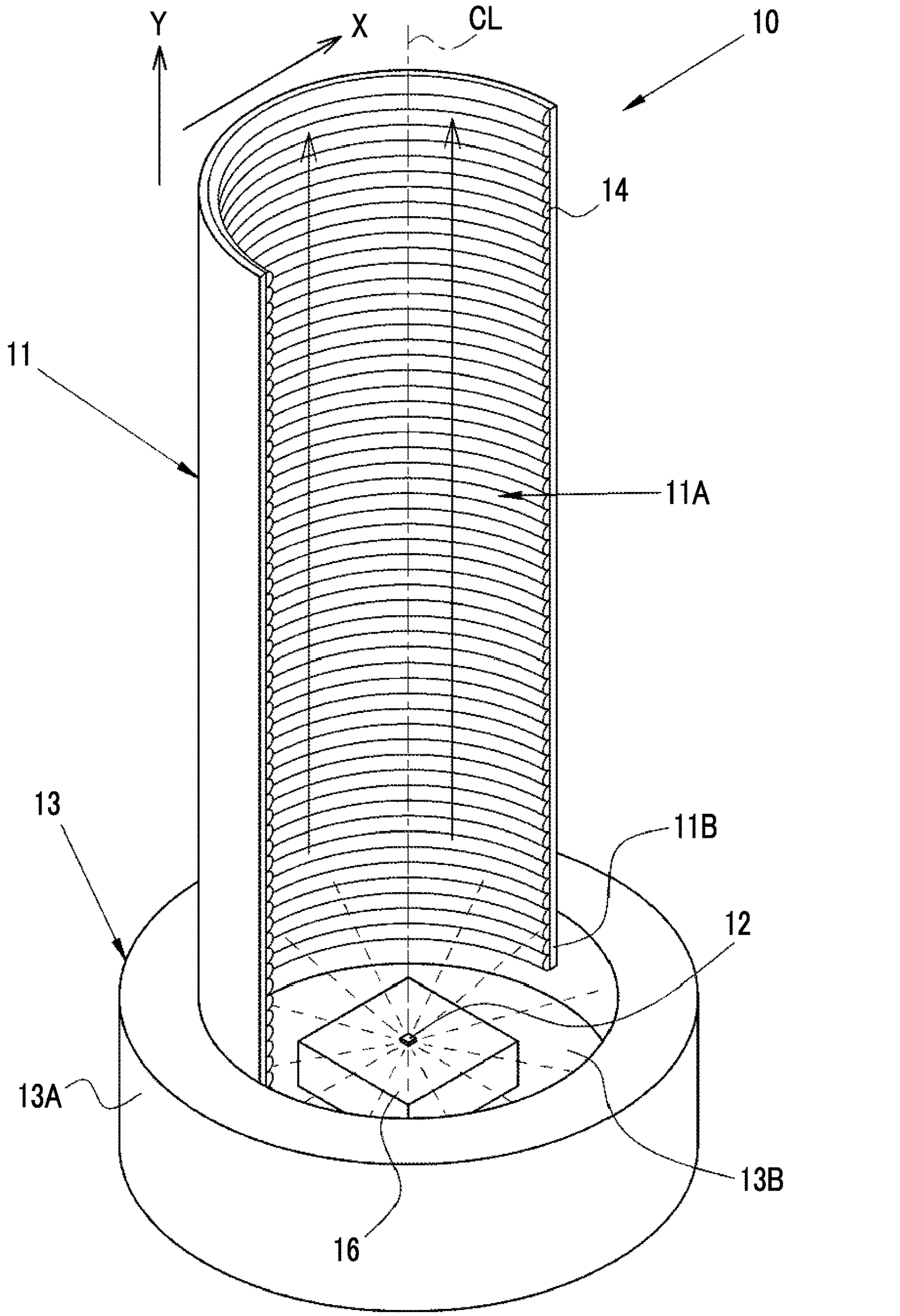
FIG. 1 is a perspective view of an illumination device of the present invention when viewed from the front.

In FIG. 1, an illumination device 10 includes a lenticular lens sheet 11, an LED light source 12, and a support member 13. The lenticular lens sheet 11 includes a plurality of plano-convex cylindrical lenses 14. Each plano-convex cylindrical lens 14 has a semi-cylindrical convex shape 14A, and has a flat shape on a side opposite to the convex shape 14A (see FIG. 2). Each plano-convex cylindrical lens 14 extends in an X direction (first direction), and a plurality of plano-convex cylindrical lenses 14 is arranged such that adjacent plano-convex cylindrical lenses are parallel to each other. That is, the plano-convex cylindrical lenses 14 are arranged at regular pitches in a Y direction (second direction) perpendicular to the X direction.

The lenticular lens sheet 11 is curved in the X direction, and a surface (hereinafter, referred to as a convex surface) 11A formed by the convex shapes 14A of the plano-convex cylindrical lenses 14 is formed in a concave shape. In the present embodiment, the lenticular lens sheet 11 has a semi-cylindrical shape curved in an arc shape around a central axis CL along the Y direction. That is, the curvature is the same on the section of the lenticular lens sheet 11 perpendicular to the Y direction.

A lower end portion 11B of the lenticular lens sheet 11 which is one end portion in the Y direction is supported by the support member 13. The support member 13 includes a cylindrical portion 13A and a bottom portion 13B. The cylindrical portion 13A supports a portion around the lower end portion 11B of the lenticular lens sheet 11. The bottom portion 13B closes a bottom surface of the cylindrical portion 13A. For example, the illumination device 10 is provided on a floor or a table in a room such that the support member 13 faces downwards and the convex surface 11A faces an observer.

The LED light source 12 is a light source of the illumination device 10, and is attached to a pedestal 16 provided on the bottom portion 13B of the support member 13. The LED light source 12 is a so-called point light source of which a chip-like element portion emits light rays and a central portion emits strong light rays. A power supply unit (not shown) such as a battery that supplies power to the LED light source 12 is built in the pedestal 16. The illumination device 10 is able to be used as a decoration provided on a table or a desk. A switch (not shown) for turning on or off the power supply of the power supply unit is provided at the pedestal 16.

Figure 3:
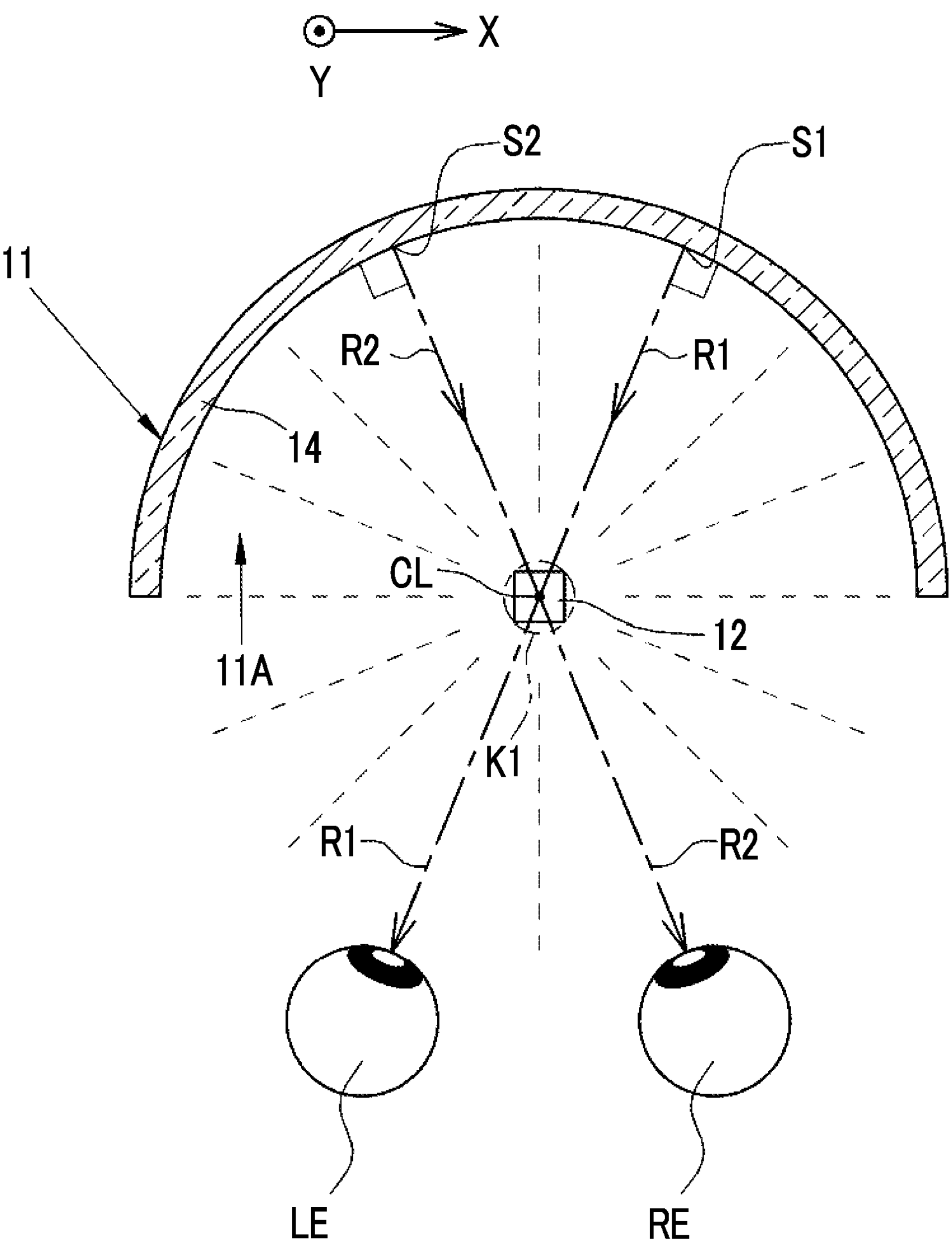
FIG. 3 is a sectional view of main parts perpendicular to a Y direction of the illumination device.

The LED light source 12 is positioned inside the convex surface 11A of the lenticular lens sheet 11 and is on the central axis CL (see FIG. 3). That is, a region around the LED light source 12 is surrounded by the cylindrical portion 13A of the support member 13. The cylindrical portion 13A of the support member 13 functions as a light shielding portion that blocks light rays emitted to a side (a side on which the observer is positioned) opposite to the lenticular lens sheet 11 in a direction perpendicular to the Y direction from the LED light source 12.

Figure 2:
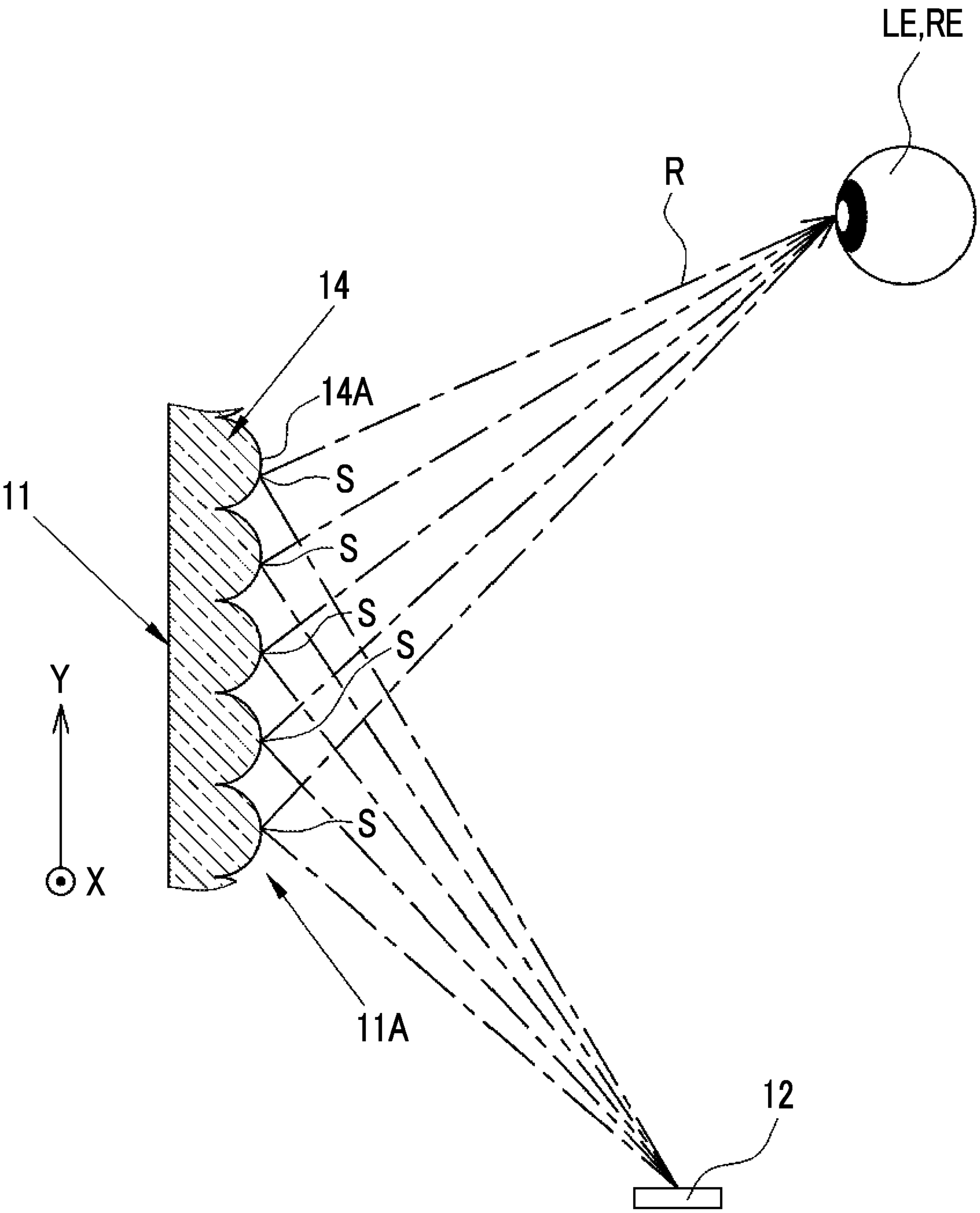
FIG. 2 is a sectional view of main parts perpendicular to an X direction of the illumination device.

FIG. 2 shows components which are reflected from the convex surface 11A in the Y direction and are guided to the eyes of the observer, among components acquired by reflecting the light rays emitted from the LED light source 12 from the convex surface 11A of the lenticular lens sheet 11. Since the plano-convex cylindrical lenses 14 are arranged at regular pitches in the Y direction, the irradiation light rays from the LED light source 12 are reflected from the convex surface 11A formed by the convex shapes 14A of the plano-convex cylindrical lenses 14. Since the convex surface 11A has a semi-cylindrical shape, components (hereinafter, referred to as reflection components R) incident on left and right eyes LE and RE of the observer are present in the reflection light rays reflected from the convex surface 11A.

In a case where it is assumed that points at which the reflection components R are reflected from the convex surface 11A are bright points S, the bright points S form line-shaped light rays along the Y direction.

As shown in FIG. 3, the LED light source 12 is positioned on the central axis CL on the section perpendicular to the Y direction. Thus, the irradiation light rays from the LED light source 12 are vertically incident on and are vertically reflected from the convex surface 11A of the lenticular lens sheet 11 on the plane perpendicular to the Y direction. Thus, the positions of the observed bright points S are different between the left eye LE and the right eye RE of the observer. Hereinafter, the bright point S observed by the left eye LE is called a first bright point S1, and the bright point S observed by the right eye RE is called a second bright point S2.

The reflection component R (hereinafter, referred to as a first reflection component R1) passed through a portion (that is, a portion above the LED light source 12) near the central axis CL from the first bright point S1 is incident on the left eye LE of the observer. Similarly, the reflection component R (hereinafter, referred to as a second reflection component R2) passed through a portion (that is, a portion above the LED light source 12) near the central axis CL from the second bright point S2 is incident on the right eye RE of the observer.

Figure 4:
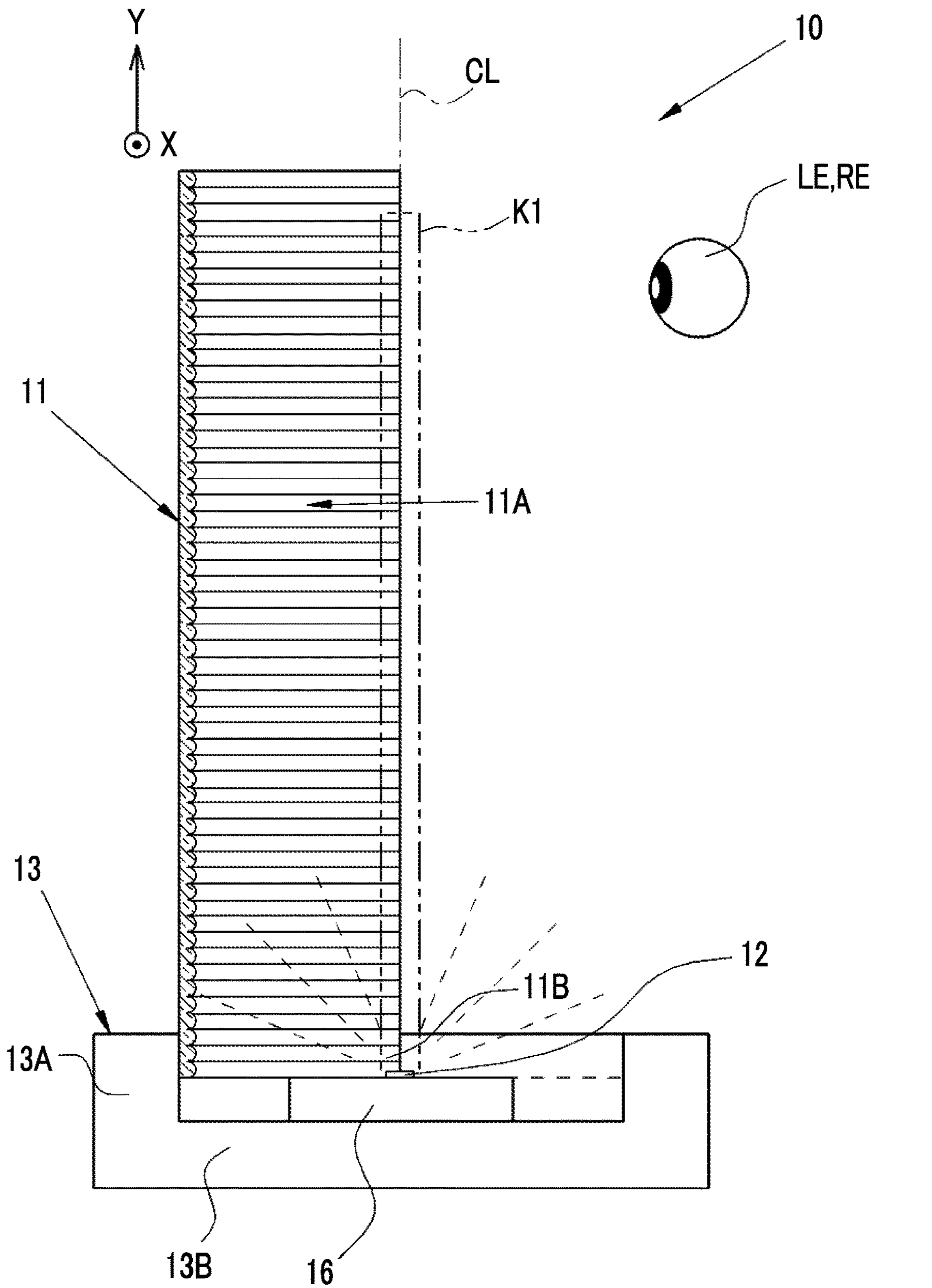
FIG. 4 is a longitudinal sectional view of the illumination device.

As shown in FIG. 4, the observer who observes the illumination device 10 observes a virtual image K1 of a light emitter as if the light emitter is present in a position (that is, a position with the central axis CL as a center) in which the first reflection component R1 and the second reflection component R2 cross each other due to parallax between the first bright point S1 and the second bright point S2. The virtual image K1 has a line shape along the Y direction. The virtual image has substantially the same width as the LED light source 12, and has substantially the same length as the dimension of the lenticular lens sheet 11 in the Y direction.

As described above, the observer who observes the illumination device 10 observes the virtual image K1 as if the line-shaped light emitter rises up in front of the lenticular lens sheet 11. Thus, in the illumination device 10, not the diffusion light as in the illumination device described in JP2007-257857A but the virtual image of the light emitter is able to be observed, and high decorativeness using the lenticular lens sheet is acquired.

Since the light rays emitted from the LED light source 12 in the direction perpendicular to the Y direction are blocked by the cylindrical portion 13A of the support member 13, light rays are not directly guided to the left and right eyes LE and RE from the LED light source 12, and thus, the observer observes only the virtual image K1. Accordingly, decorativeness like indirect illumination is also acquired.

Second Embodiment

Figure 5:
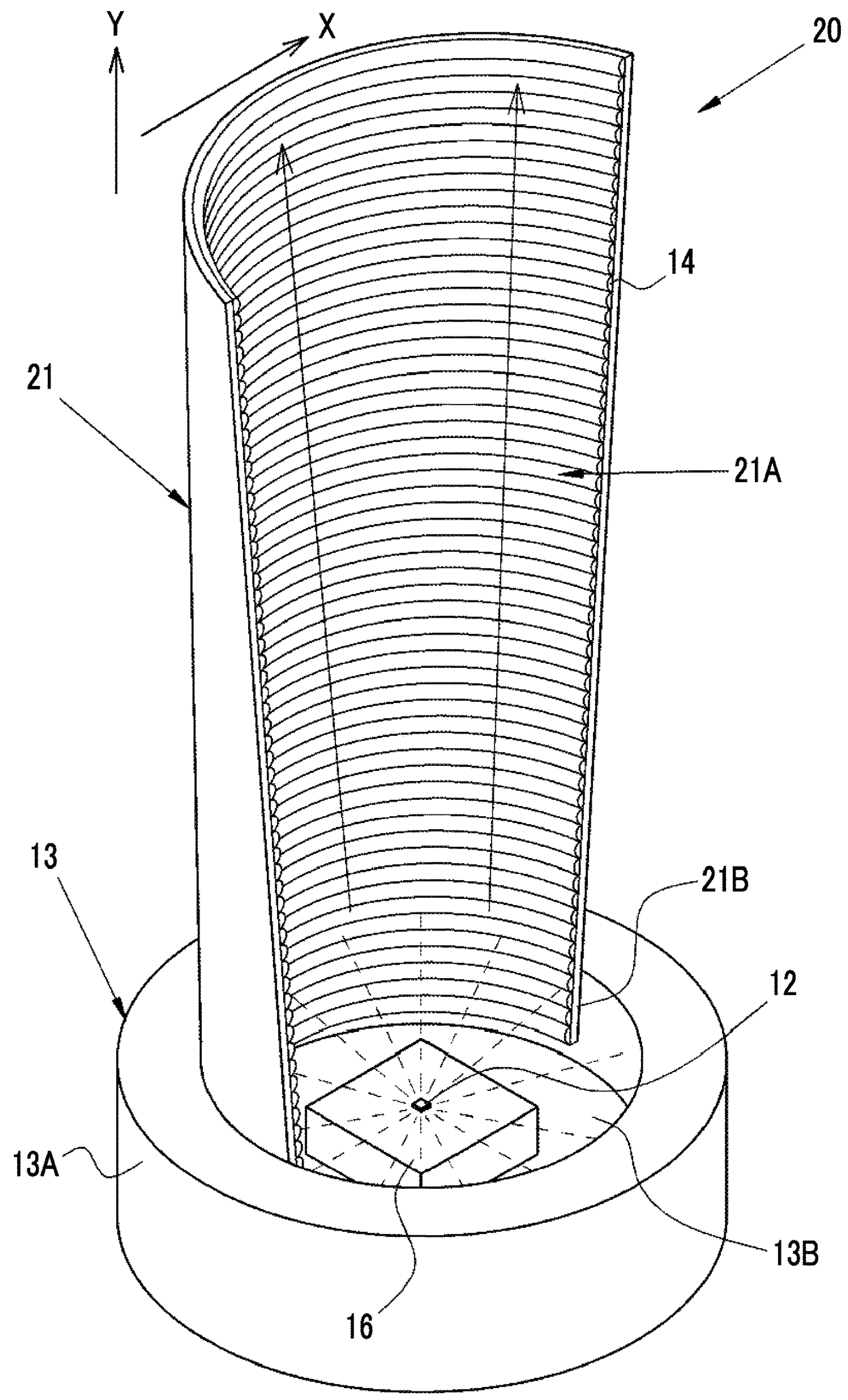
FIG. 5 is a perspective view of an illumination device of a second embodiment when viewed from the front.

As shown in FIG. 5, in the second embodiment, a lenticular lens sheet 21 is curved such that curvature is changed as a distance from the LED light source 12 becomes larger in the Y direction. Specifically, in an illumination device 20 of the present embodiment, curvature on the section of the lenticular lens sheet 21 perpendicular to the Y direction becomes smaller as the distance from the LED light source 12 becomes larger in the Y direction.

Similar to the lenticular lens sheet 11 of the first embodiment, the lenticular lens sheet 21 includes the plurality of plano-convex cylindrical lenses 14. The plano-convex cylindrical lenses 14 extend in the X direction, and are arranged at regular pitches in the Y direction perpendicular to the X direction.

The lenticular lens sheet 21 is curved in the X direction, and a surface (hereinafter, referred to as a convex surface) 21A on which the convex shapes 14A of the plano-convex cylindrical lenses 14 are formed is formed in a concave shape. In the present embodiment, the lenticular lens sheet 21 is curved such that the sectional shape perpendicular to the Y direction has an arc shape and the curvature becomes smaller as the distance from the LED light source 12 becomes larger in the Y direction. Thus, the positions of the centers of the arcs are different on the section near the LED light source 12 and the section in the position far away from the LED light source 12 in the Y direction.

A lower end portion 21B of the lenticular lens sheet 21 which is one end portion in the Y direction is supported by the support member 13. Another configuration of the illumination device 20 is the same as the configuration of the illumination device 10 of the first embodiment.

Figure 6A:
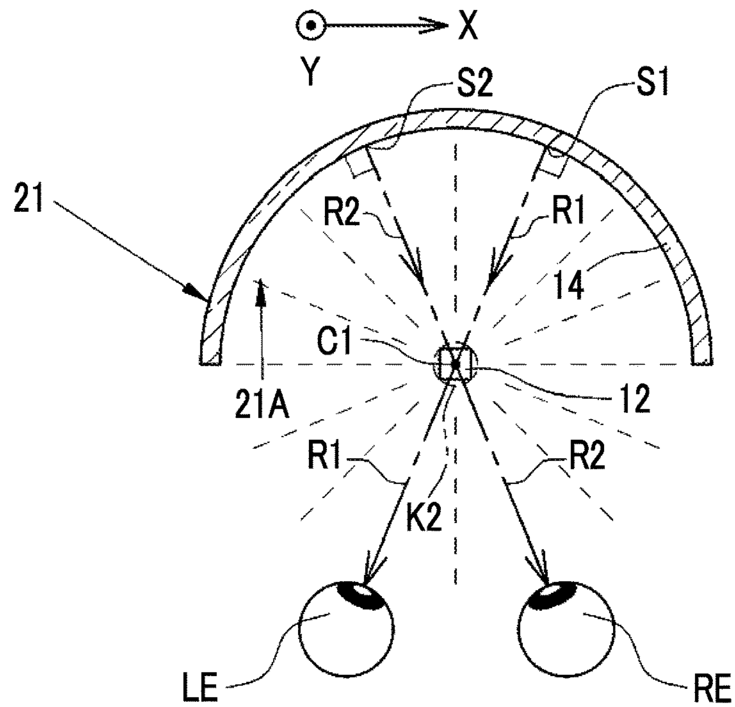
FIG. 6A is a sectional view of main parts the illumination device of the second embodiment and is a sectional view of main parts perpendicular to a Y direction near a light source.

As shown in FIG. 6A, the LED light source 12 is positioned at a center C1 of the arc of the lenticular lens sheet 21 on the section near the LED light source 12 in the Y direction. On the section shown in FIG. 6A, the irradiation light rays from the LED light source 12 are vertically reflected from the convex surface 21A of the lenticular lens sheet 21. Accordingly, similar to the first embodiment, the first and second reflection components R1 and R2 passed through portions (that is, portions above the LED light source 12) near the center C1 from the first and second bright points S1 and S2 are incident on the eyes LE and RE of the observer.

Figure 6B:
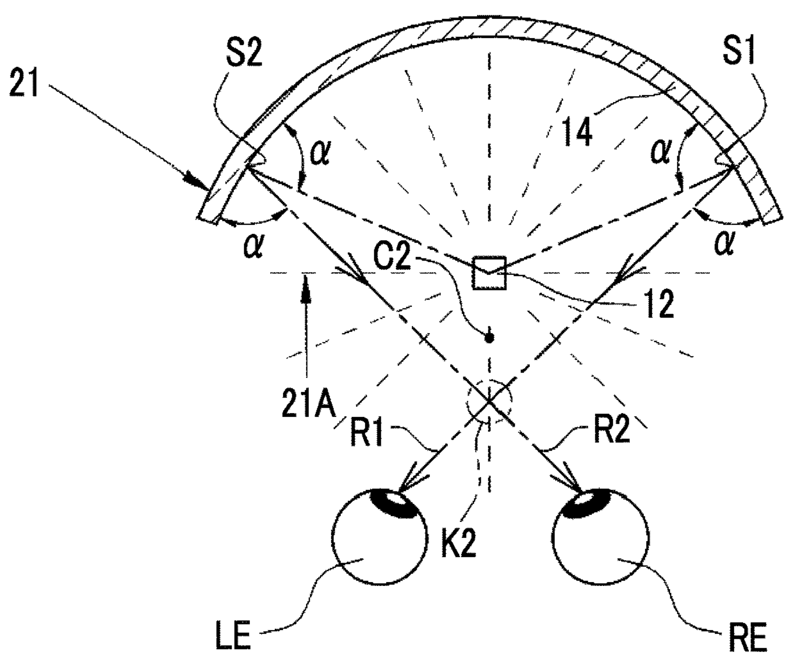
FIG. 6B is a sectional view of main parts of the illumination device of the second embodiment, and is a sectional view of main parts perpendicular to the Y direction in a position far away from the light source.

As shown in FIG. 6B, the LED light source 12 is positioned so as to be closer to the convex surface 21A than a center C2 of the arc of the lenticular lens sheet 21 on the section in the position far away from the LED light source 12 in the Y direction. On the section shown in FIG. 6B, the irradiation light rays from the LED light source 12 are incident on the convex surface 21A of the lenticular lens sheet 21 at an incident angle $\alpha$ ($\alpha<90°$), and are reflected at a reflection angle $\alpha$. Accordingly, the first and second reflection components R1 and R2 passed through the positions closer to the observer than the LED light source 12 from the first and second bright points S1 and S2 are incident on the eyes LE and RE of the observer.

Figure 7:
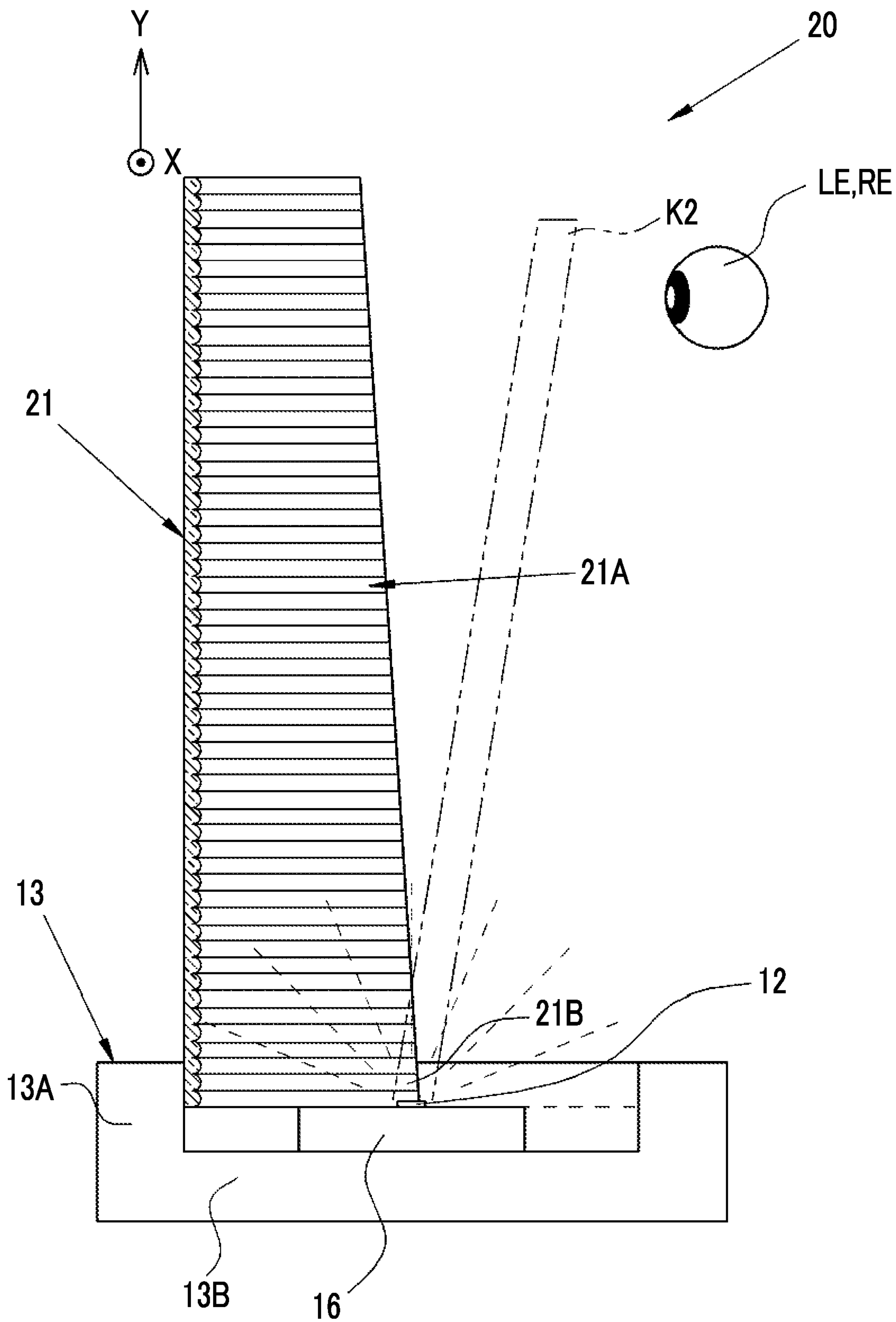
FIG. 7 is a longitudinal sectional view of the illumination device of the second embodiment.

As stated above, since the point at which the first and second reflection components R1 and R2 cross each other is positioned so as to be close to the observer as the distance from the LED light source 12 becomes larger in the Y direction, a virtual image K2 of the light emitter observed by the observer tilts, as shown in FIG. 7. The virtual image K2 has the line shape tilting toward the observer in the Y direction. The virtual image has substantially the same width as the LED light source 12, and has substantially the same length as the dimension of the lenticular lens sheet 11 in the Y direction.

As stated above, since the line-shaped light emitter rises up in front of the lenticular lens sheet 11 and the observer who observes the illumination device 20 observes the virtual image K2 tilting toward the observer, decorativeness different from that of the illumination device 10 of the first embodiment is acquired.

Third Embodiment

Figure 8:
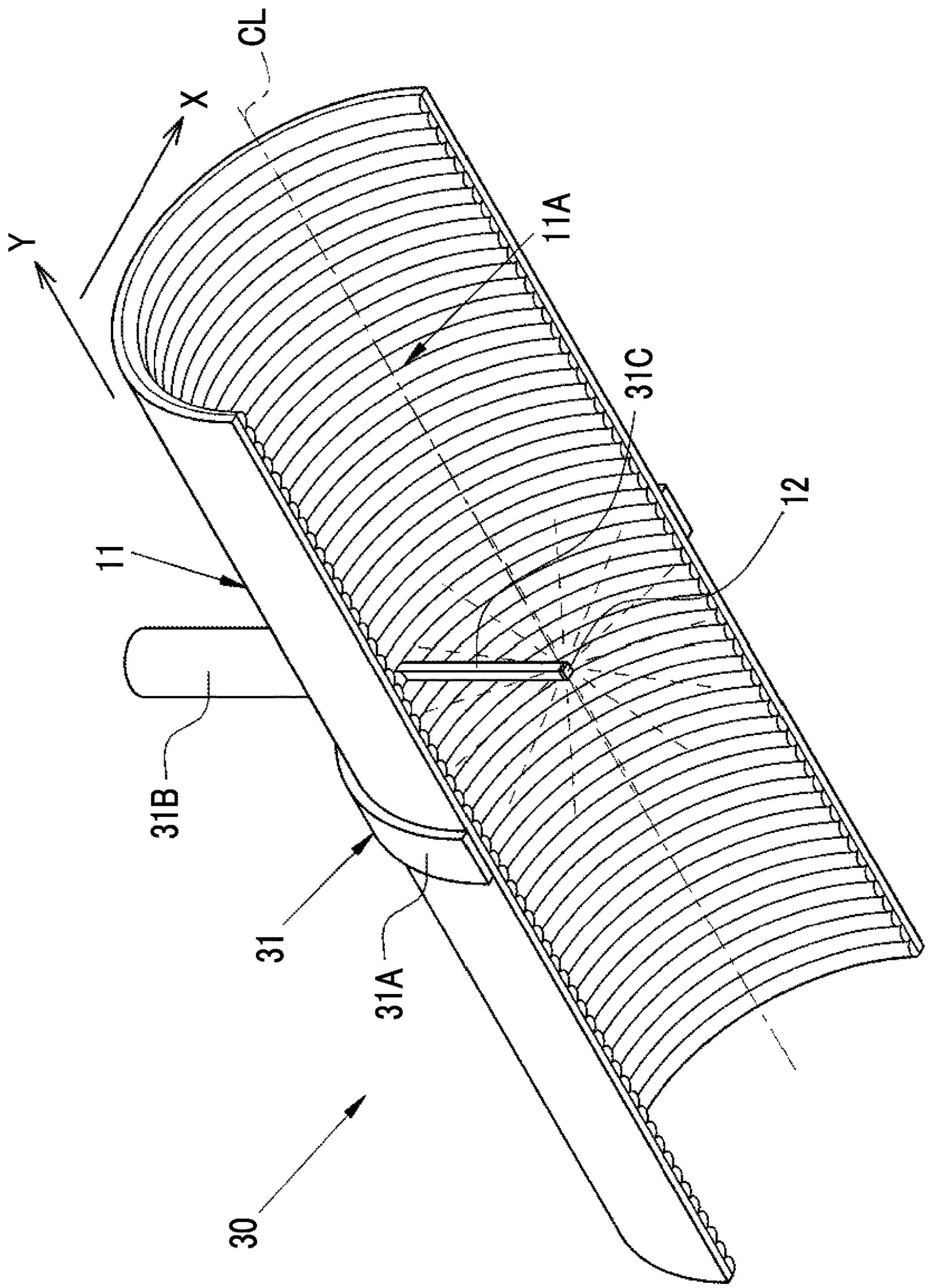
FIG. 8 is a perspective view of an illumination device of a third embodiment when viewed from the bottom.

In the third embodiment, the LED light source 12 is disposed near the center of the lenticular lens sheet in the Y direction, as shown in FIG. 8. In an illumination device 30 of the present embodiment includes the same lenticular lens sheet 11 as that of the first embodiment, the LED light source 12, and a support member 31.

A central portion of the lenticular lens sheet 11 in the Y direction is supported by the support member 31. The support member 31 includes a semi-cylindrical portion 31A that supports a portion around the central portion of the lenticular lens sheet 11, an attachment portion 31B, and a coupling portion 31C. The attachment portion 31B is formed in a cylindrical shape extending from the semi-cylindrical portion 31A in one direction perpendicular to the Y direction. For example, the illumination device 30 is provided such that the attachment portion 31B is fixed to a ceiling and the convex surface 11A faces the observer. The coupling portion 31C penetrates the lenticular lens sheet 11, and a distal end portion thereof is positioned inside the convex surface 11A of the lenticular lens sheet 11. The LED light source 12 is attached to the distal end portion of the coupling portion 31C, and is positioned inside the convex surface 11A of the lenticular lens sheet 11 and is positioned on the central axis CL.

Figure 9:
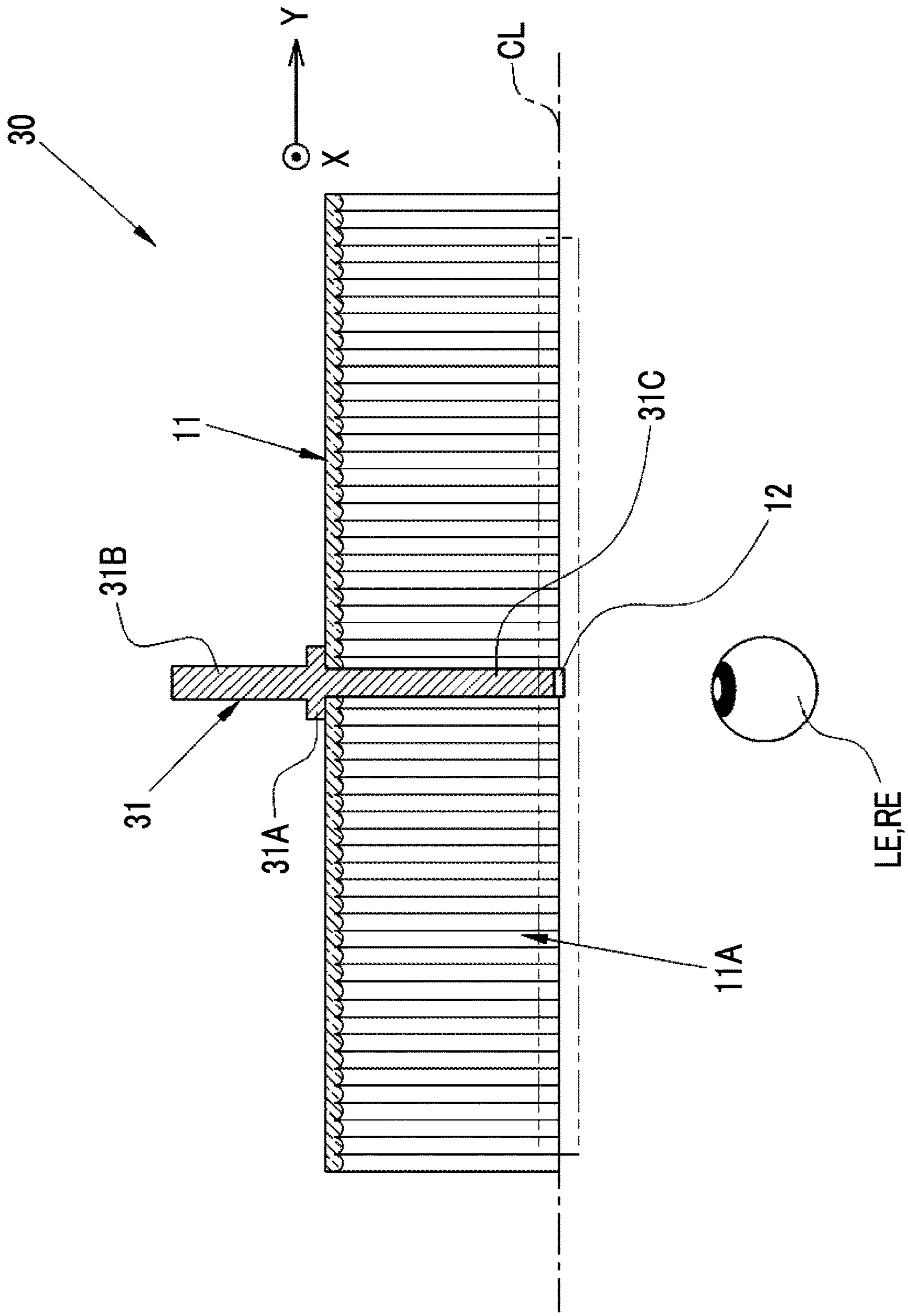
FIG. 9 is a sectional view perpendicular to an X direction of the illumination device of the third embodiment.

As shown in FIG. 9, similar to the first embodiment, the observer who observes the illumination device 30 observes a virtual image K3 of the light emitter present in the position with the central axis CL as a center. The virtual image K3 has the line shape along the Y direction. The virtual image has substantially the same width as the LED light source 12 toward both end portions from the LED light source 12 in the Y direction, and has substantially the same length as the dimension of the lenticular lens sheet 11 in the Y direction.

Fourth Embodiment

Figure 10:
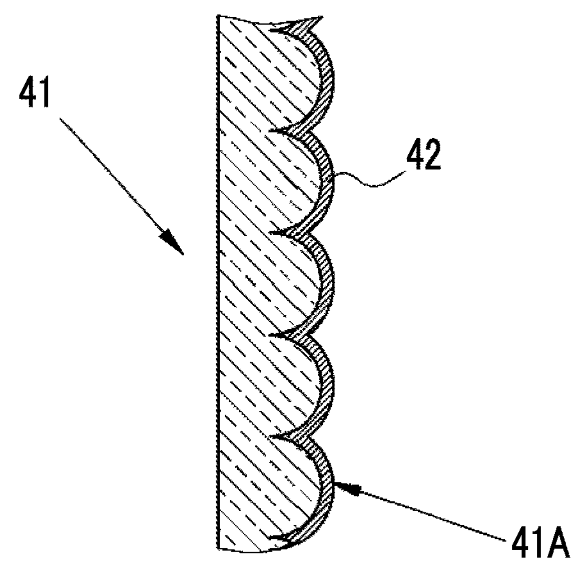
FIG. 10 is a sectional view of main parts of a lenticular lens sheet used in an illumination device of a fourth embodiment.

In the fourth embodiment, a light reflection film 42 (for example, a vapor deposited film of metal) that reflects the light rays of the LED light source 12 is formed on the convex surface 41A of the lenticular lens sheet 41, as shown in FIG. 10. Accordingly, reflection efficiency from the LED light source 12 on the convex surface 41A is increased. The light reflection film 42 is applicable to the lenticular lens sheets of the first to third embodiments. A sharp virtual image is observed with higher luminance by increasing light reflectance using the light reflection film 42.

Fifth Embodiment

Figure 11:
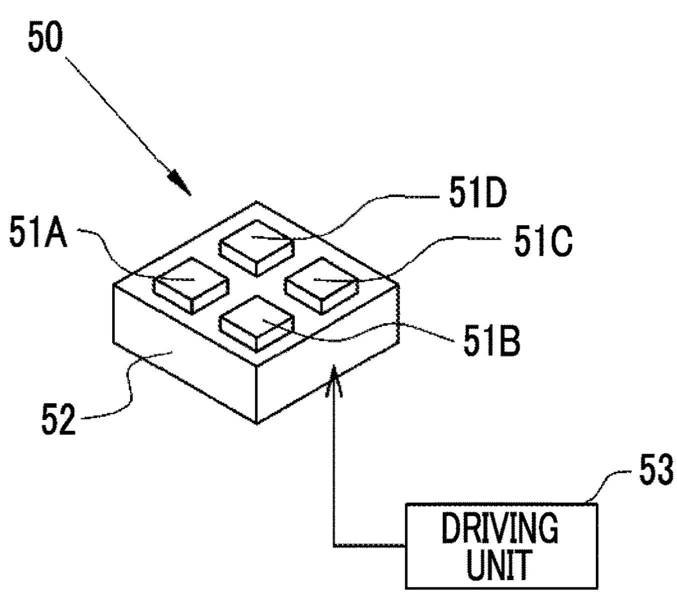
FIG. 11 is a perspective view showing a light source used in an illumination device of a fifth embodiment.

In the fifth embodiment, a light source 50 of which color is variable is used instead of the LED light sources 12 of the embodiments, as shown in FIG. 11. The light source 50 includes a plurality of LED light sources 51A to 51D of which emission colors are different, and a substrate 52 on which the LED light sources 51A to 51D are provided. For example, red, green, blue, and white LED light sources are used as the LED light sources 51A to 51D. A driving unit 53 is connected to the substrate 52.

The driving unit 53 changes the emission color of the light source 50 by changing the emission states (light emission intensity and duty) of the LED light sources 51A to 51D. Accordingly, it is possible to further increase decorativeness by changing the emission color of the light source 50 depending on a situation.

Sixth Embodiment

Figure 12:
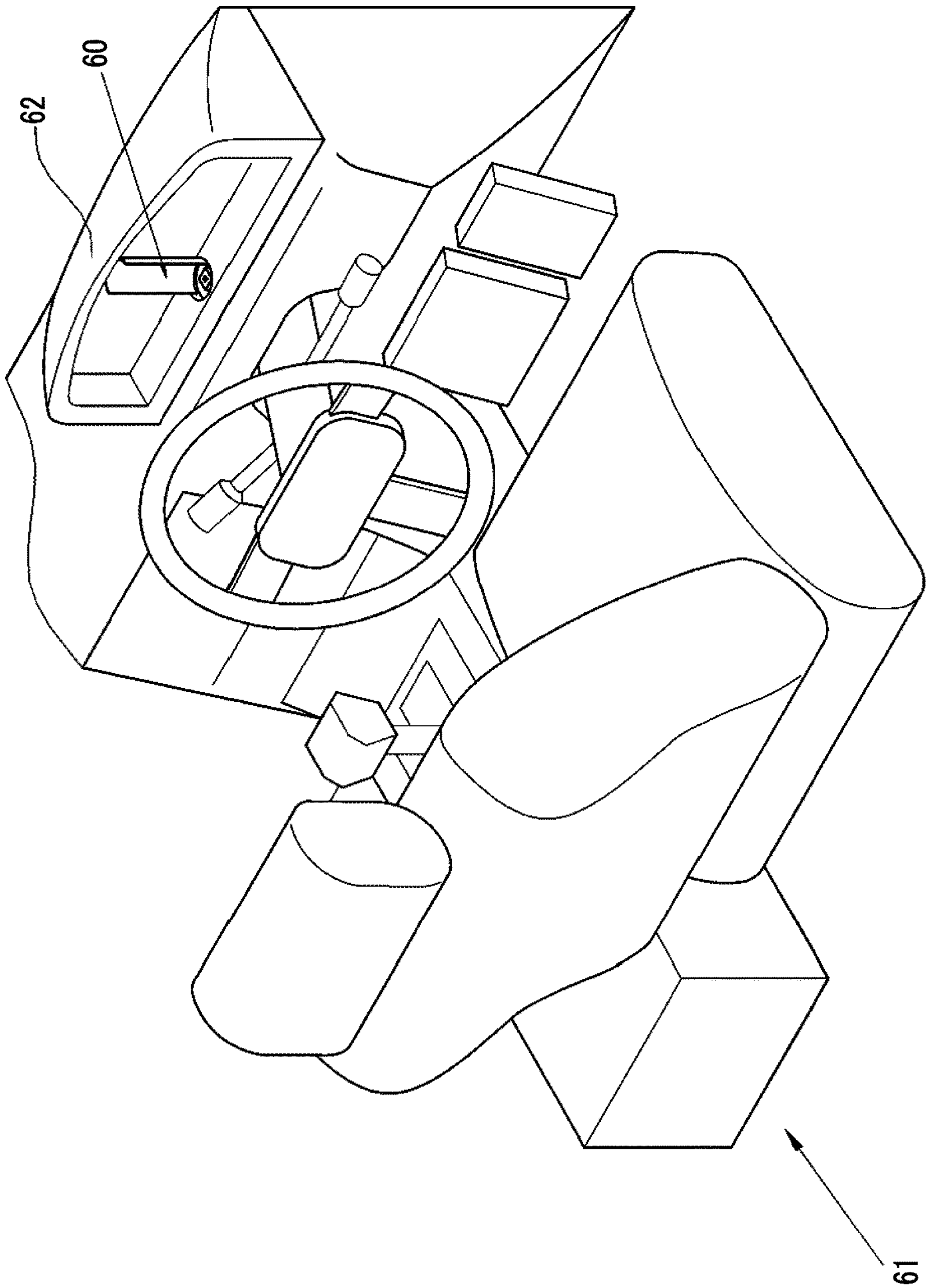
FIG. 12 is a perspective view showing an example in which the present invention is applied to an illumination device of a vehicle.

FIG. 12 shows an example in which an illumination device 60 is attached to the interior equipment of a vehicle 61. For example, the illumination device 60 is attached so as to be embedded in a part of the interior equipment. The illumination device 60 has the same configuration as that of any of the illumination devices of the first to fifth embodiments. For example, the illumination device 60 is attached to the inside of a meter panel 62 of the vehicle 61. In this case, it is preferable that an emission state of the illumination device 60 is changed depending on an operation state (a speed or the like) of the vehicle 61.

Although it has been described in the embodiments that the LED light source is used as the light source, the present invention is not limited thereto. A point light source other than the LED light source may be used. Although it has been described in the embodiments that the lenticular lens sheet is curved in the arc shape, the lenticular lens sheet may be curved in a curved-surface shape other than the arc shape. For example, the lenticular lens sheet may be curved in an elliptical arc shape.

Although it has been described in the embodiments that the present invention is applied to the illumination device in the room or the illumination device attached to the interior equipment of the vehicle, the present invention is not limited thereto. The present invention may be applied to an illumination device to be used in commercial facilities such as amusement parks or entertainment machines such as game machines.

EXPLANATION OF REFERENCES

10, 20, 30, 60: illumination device
11, 21, 41: lenticular lens sheet
11A, 21A, 41A: convex surface
12: LED light source
13, 31: support member
13A: cylindrical portion
42: light reflection film

What is claimed is:

1. An illumination device comprising:

a lenticular lens sheet that is acquired by arranging a plurality of plano-convex cylindrical lenses which extends in a first direction in a second direction perpendicular to the first direction, the lenticular lens sheet being curved in the first direction and having a convex surface of the plano-convex cylindrical lenses formed in a concave shape; and a light source that is disposed inside the convex surface of the plano-convex cylindrical lenses, wherein in a case where components acquired by reflecting light rays emitted from the light source from the convex surface include reflection components incident on left and right eyes of an observer positioned opposite to the lenticular lens with respect to the light source, bright points at which the reflection components are reflected from the convex surface form line-shaped light rays along the second direction.

2. The illumination device according to claim 1, wherein the light source is a point light source.

3. The illumination device according to claim 1, wherein the lenticular lens sheet is curved in an arc shape.

4. The illumination device according to claim 1, wherein a curvature of the lenticular lens sheet formed in the concave shape is changed as a distance from the light source becomes larger in the second direction.

5. The illumination device according to claim 4, wherein the curvature becomes smaller as the distance from the light source becomes larger in the second direction.

6. The illumination device according to claim 1, wherein a light reflection film that reflects light of the light source is formed on the convex surface of the lenticular lens sheet.

7. The illumination device according to claim 1, further comprising:

a support member that supports a portion around a position of the lenticular lens sheet in which the light source is disposed.

8. The illumination device according to claim 7, wherein the support member includes a light shielding portion that blocks light emitted from the light source in a direction perpendicular to the second direction.

9. The illumination device according to claim 1, wherein color of the light source is variable.

* * * * *